United States Patent [19]

Holden et al.

[11] Patent Number: 4,464,856

[45] Date of Patent: Aug. 14, 1984

[54] FISHING ROD WITH IMPROVED CASTING CHARACTERISTICS

[75] Inventors: John Holden, Chelmsford, England; Milton J. Green, Quilcene, Wash.

[73] Assignee: Woodstream Corporation, Lititz, Pa.

[21] Appl. No.: 340,848

[22] Filed: Jan. 20, 1982

[51] Int. Cl.³ .............................................. A01K 87/00
[52] U.S. Cl. .................................... 43/18.5; 156/173; 156/187; 249/175
[58] Field of Search ................ 43/18.5, 18.1; 249/175; 156/173, 187

[56] References Cited

U.S. PATENT DOCUMENTS

| | | | |
|---|---|---|---|
| 3,003,275 | 10/1961 | Reid | 43/18.5 |
| 3,186,122 | 6/1965 | Clock | 43/18.5 |
| 3,260,010 | 7/1966 | Dubois | 43/18.5 |
| 4,043,074 | 8/1977 | Airhart | 43/18.5 |

FOREIGN PATENT DOCUMENTS

| | | | |
|---|---|---|---|
| 36915 | 3/1965 | German Democratic Rep. | 43/18.5 |
| 1253578 | 11/1971 | United Kingdom | 43/18.5 |

*Primary Examiner*—Gene P. Crosby
*Attorney, Agent, or Firm*—Holman & Stern

[57] ABSTRACT

A fishing rod capable of increased casting distances is made of two (2) concentric-frictionally engaged blanks and includes a stiff, but not rigid butt zone incorporating most of the first blank, a fast tapered mid-zone overlapping both blanks and a flexible tip zone at the distal end of the second blank. The blanks have inner diameter of different taper rates per unit of length in the various zones to achieve the desired characteristics. The inner diameter taper rate of the mid-zone is, importantly, an order of magnitude greater than the taper rate of the butt zone. Mandrels employed to fabricate the respective blanks are tapered accordingly.

17 Claims, 12 Drawing Figures

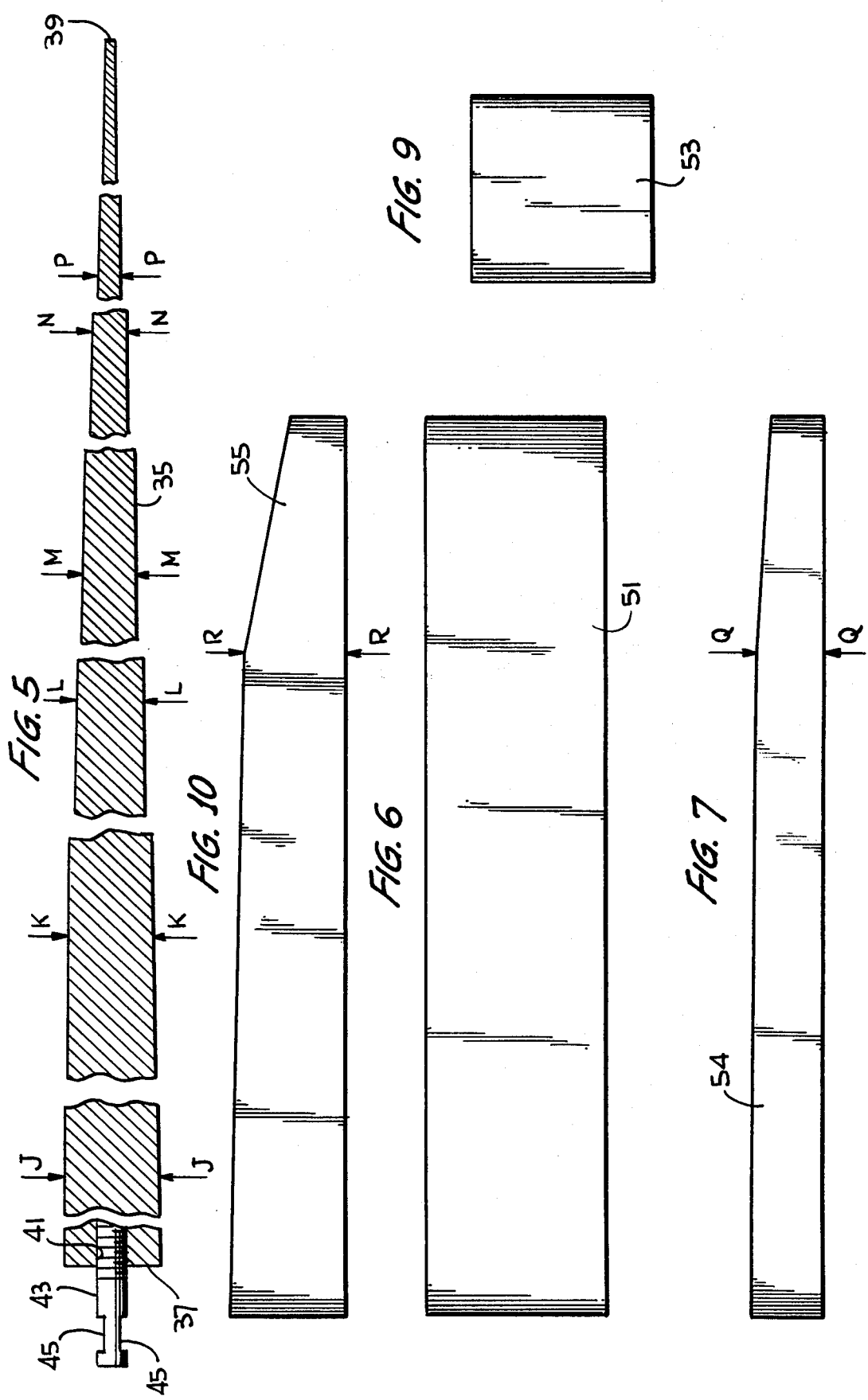

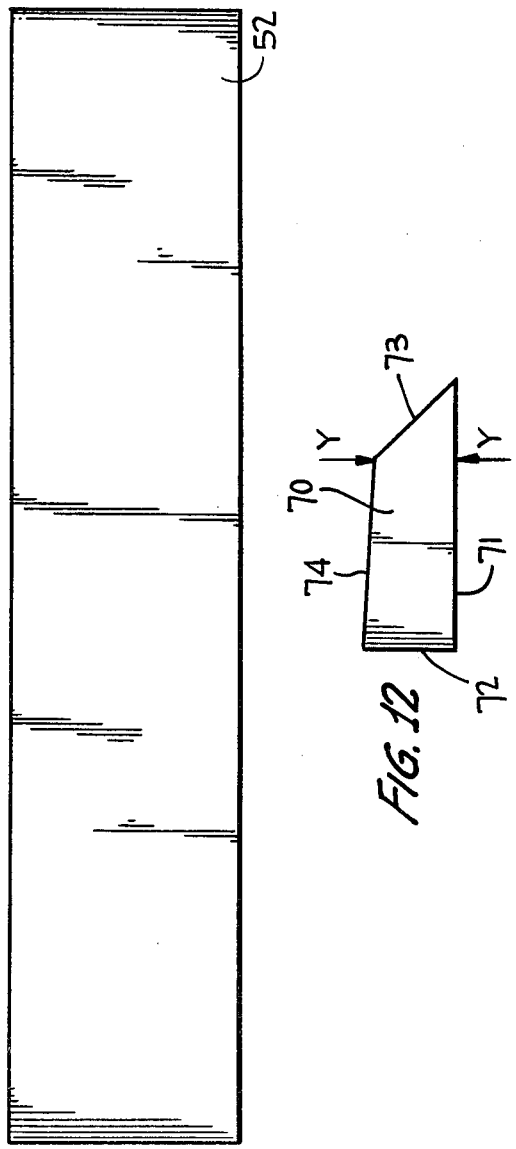
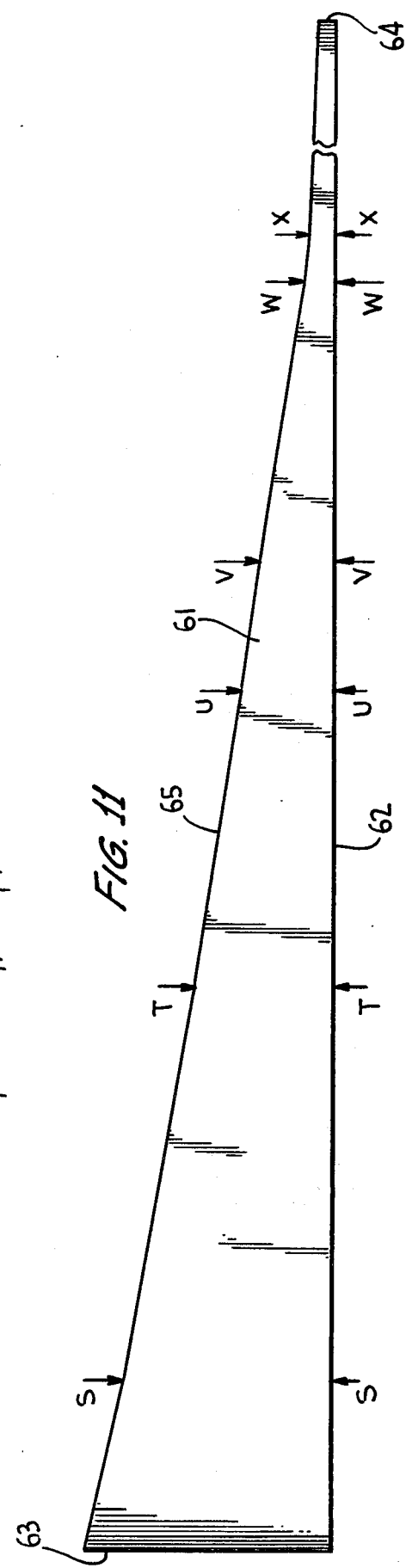

FISHING ROD WITH IMPROVED CASTING CHARACTERISTICS

TECHNICAL FIELD

The present invention relates to fishing rods and, more particularly, to fishing rods having improved casting characteristics.

BACKGROUND OF THE INVENTION

Most surf fishing rods manufactured in the United States are inefficient for casting purposes. The primary problem with such rods results from the fact that the rod blanks are tapered at a very slow rate along the blank length. While it is theoretically possible to design slow taper blanks for reasonable casting results, such design is dependent upon the strength and physique of the individual angler. Moreover, the stiffness required in the rod to achieve reasonable casting distance is almost useless for good fishing when slow taper blanks are employed. Further, such rods are only able to handle sinkers within a narrow weight range with any effectiveness. In other words, in manufacturing a slow tapered rod for good casting, the sinker weight would have to be specified and would inevitably clash with the angler's need for a rod which accommodates a realistically wide range of sinkers and lures. Thus the designer would have to specify casting technique, line weight, reel type, etc., all of which further restricts the versatility and appeal of the rod. In any case, the finest slow taper rod built is able to cast no more than about 125 yards.

On the other hand, foreign-made rods, particularly rods manufactured in Great Britain, employ faster tapering blanks to easily achieve casting distances of around 200 yards. However, such foreign-made fishing rods have by no means optimized casting distance and, under any circumstances, have not properly married the requirements of casting with satisfactory fishing characteristics.

It is conventional to manufacture fishing rods by wrapping sheets of material about a suitably configured elongated mandrel. The sheets are generally made of fiberglass impregnated with a resin and partially cured by heat treatment before being wrapped about the mandrel. The partially cured sheets are successively wrapped about the mandrel and then fully cured in an oven until the sheets are hardened. The resulting blank is then removed from the mandrel. In providing a rod having a sufficient fast taper portion to achieve desired casting distances, the mandrel configuration is all important. Specifically, the degree of taper of the mandrel permits minimizing the number of wraps of the various sheets to achieve the desired rod blank diameter for optimizing casting distances.

OBJECTS AND SUMMARY OF THE INVENTION

It is an object of the present invention to provide a fishing rod which is capable of achieving casting distances in excess of 200 yards without sacrificing the rod characteristics required for fishing.

It is another object of the present invention to provide an optimized fishing rod configuration for achieving long distance casting without requiring a special design for each individual user.

It is another object of the present invention to provide an improved configuration for mandrels employed in fabricating fishing rods capable of achieving large casting distances without sacrificing desirable fishing characteristics of the rod and without requiring specific designs for each individual angler.

In accordance with the present invention, a fishing rod takes the conventional form of two elongated hollow tapered tubular blanks wherein one of the blanks is frictionally engaged in coaxial alignment within the other. The resulting rod structure may be looked upon as having three separate sections. These sections include a butt section which is approximately four (4) feet long and includes the major portion of the length of the first of the blanks. The butt section is stiff, but not rigid, and provides the leverage necessary for long range fishing while retaining the sensitivity for good handling and long distance casting. The tip zone, comprising approximately two (2) feet at the distal end of the second blank, is light and flexible. These characteristics permit high bite sensitivity, a relatively large sinker weight range, easy casting with conventional reels, a smooth casting action to allow safe reduction in line breaking strain, and a fast recovery speed to promote longer casts and finer control. The mid-zone, overlapping both of the blanks and extending between the butt zone and tip zone, is the crucial portion of the fishing rod. It has a fast taper so as to properly blend the tip flexibility with the butt stiffness and thereby achieve casting power and recovery action which are both efficient and easily controlled. It is the mid-zone of the rod which absorbs most of the shock during the battling of a heavy fish. The fast tapered and progressively stiff mid-zone is the most important characteristic of the fishing rod. The taper rate of the mid-zone along the rod length is approximately one order of magnitude (approximately a factor of 10) greater than the butt zone taper rate.

The mandrel used for fabricating the larger blank which encompasses the butt zone is provided with two (2) sections of different taper rate. The first zone, which starts with an outside diameter of approximately 0.996 inches, tapers at a rate of approximately 0.0009 inches of diameter per inch of length. This first zone is approximately 45 inches long and terminates with an outer diameter of approximately 0.954 inches. The second zone extends longitudinally from the first and tapers at a much faster rate, approximately 0.011 inches of diameter per inch of length. This section is approximately 19 inches in length and terminates with an outside diameter of approximately 0.745 inches.

The mandrel for fabricating the second blank of the rod includes successive sections of different taper rates. It is these different sections of taper rates, on both mandrels, which permits minimization of the number of wraps of sheet material about the mandrel in forming the blanks. The taper rates for the successive sections on the second mandrel are approximately as follows: 0.011; 0.0089; 0.0087; 0.0112; 0.0164; 0.010; and 0.0051 inches of diameter per inch of length. The second mandrel is approximately 103 inches in length and the successive sections have the following approximate lengths in inches: 18.5; 24; 18; 8; 17; 3; and 14.5. The outer diameter of the second mandrel at its larger end is approximately 1.114 inches; the outer diameter at its smaller end is approximately 0.068 inches. The outer diameter at the various breakpoints of taper rate are 0.911 inches, 0.698 inches, 0.544 inches, 0.457 inches, 0.171 inches, and 0.145 inches approximately.

We have found that the mandrels constructed in accordance with the description above permit fabrication of a rod which achieves the desired casting characteristics without sacrificing fishing characteristics, while permitting a minimum number of wraps to be utilized in forming the final rod product.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 5 is a broken view in section showing the mandrel employed to fabricate the blank of FIG. 3;

FIG. 6 is a plan view of a first sheet which is wrapped about the mandrel of FIG. 4 to form the blank of FIG. 2;

FIG. 7 is a plan view of a metal pattern;

FIGS. 8 and 9 are plan views of sheets which are laid across the pattern of FIG. 7 so that the sheets may be cut to that pattern and then wrapped about the mandrel of FIG. 4 during fabrication of the blank of FIG. 2;

FIG. 10 is a plan view of a sheet comprising a third wrap to be wrapped about the mandrel of FIG. 4 during fabrication of the blank of FIG. 2;

FIG. 11 is a plan view of a first sheet which is wrapped about the mandrel of FIG. 5 to form the blank of FIG. 3; and FIG. 12 is a plan view of a second sheet which is wrapped about the mandrel of FIG. 5 to form the blank of FIG. 3.

DESCRIPTION OF THE PREFERRED EMBODIMENTS

Figure 1:
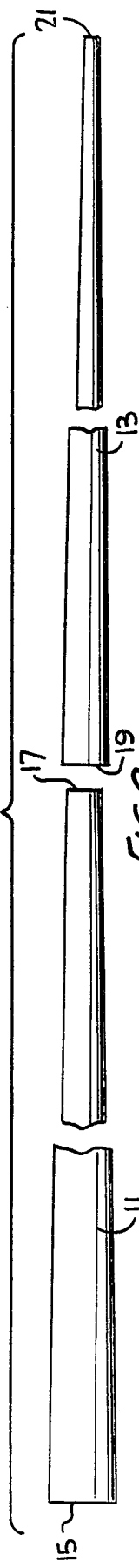
FIG. 1 is a broken view in plan of the final blanks which constitute a fishing rod constructed in accordance with the present invention.

Referring to FIG. 1 in greater detail, a fishing rod in accordance with the present invention is constructed from two (2) blanks 11 and 13. Blank 11 is an elongated hollow tapered tubular member having a large diameter end 15 and a small diameter end 17. The inner and outer diameters of blank 11 taper in a specific manner described in detail below. Blank 13 also is an elongated hollow tapered tubular member having a large diameter end 19 and a small diameter end 21. Blank 13 is also tapered in a specific manner described in detail below. The small diameter end 17 of blank 11 is received and frictionally engaged in the large diameter end 19 of blank 13 so that the resulting two-section rod is eventually made up from the two engaged and coaxially disposed blanks. In the final rod, approximately six to eight inches of blank 11 is inserted within blank 13. The rod is nominally twelve feet long when the two blanks are engaged.

Figure 2:
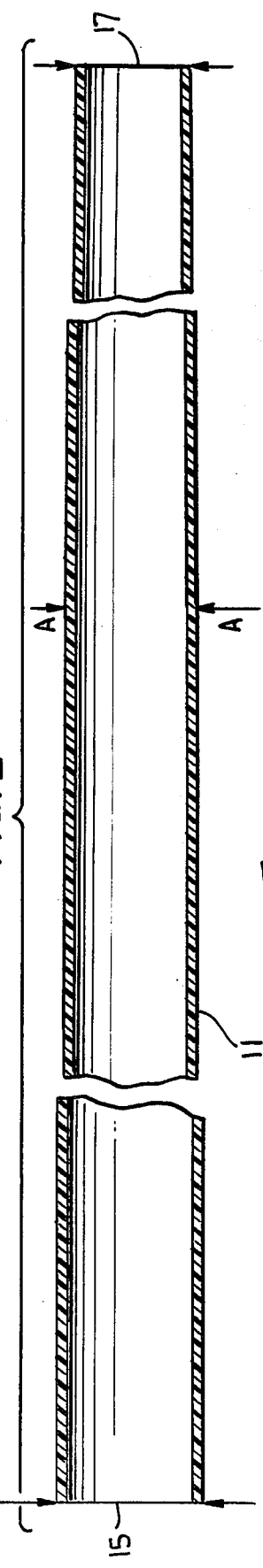
FIG. 2 is a broken view in cross-section showing the blank constituting the butt zone of the fishing rod of FIG. 1.

Referring to FIG. 2, blank 11 is shown to comprise two (2) tapered sections having different taper rates. The arrows A-A demark the transition between the two sections. The first section extends between the large diameter end 15 and arrows A-A and tapers at a relatively slow rate. For example, the taper rate in the first section for the inner diameter of blank 11 is typically on the order of 0.0009 inches per inch of blank length. The second section of blank 11, on the other hand, extends from arrows A-A to the smaller diameter end 17 of the blank and tapers at a much faster rate. The taper rate of the second section is typically on the order of 0.011 inches per inch of blank length. This difference in taper rates between the two sections is approximately an order of magnitude (or a factor of ten). The second section, that is, the faster tapered section, encompasses the beginning of the mid-zone of the rod whereas the rod butt zone includes the entire first or slower tapered section. In a typical embodiment, the outer diameter dimensions of blank 11 are as follows; 1.098 inches at larger diameter end 15; 1.062 inches at the transition point A-A; and 0.908 inches at the smaller diameter end 17. The corresponding wall thickness for this embodiment is as follows: 0.055 inches at larger diameter end 15; 0.054 inches at transition point A-A; and 0.050 inches at smaller diameter end 17. The inner diameter dimensions can be obtained by subtracting twice the wall thickness from the outer diameter dimension at each point. These inner diameter dimensions approximate corresponding dimensions on the mandrel of FIG. 4 described below.

An alternative embodiment of the blank 11 of FIG. 2 has the following outer diameter dimensions: 1.100 inches at larger diameter end 15; 1.062 inches at transition point A-A; and 0.912 inches at smaller diameter end 17. The corresponding wall thickness dimensions are 0.055 inches, 0.054 inches, and 0.049 inches, respectively.

Figure 3:
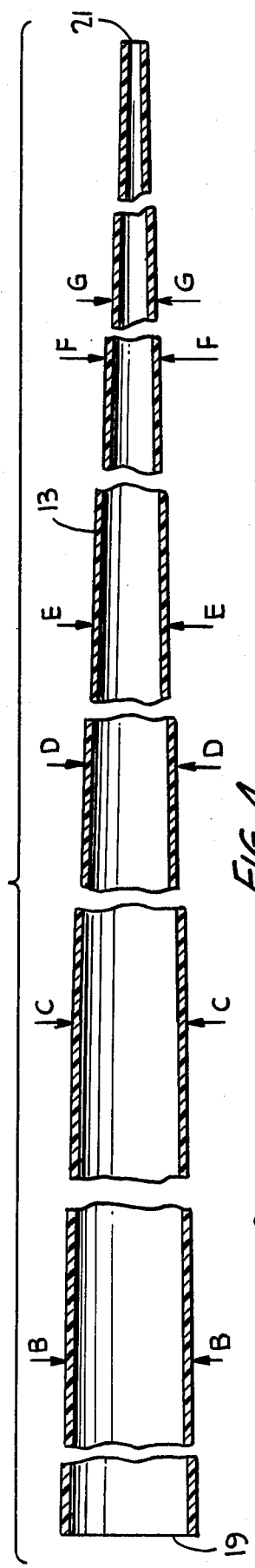
FIG. 3 is a broken view in section showing the other blank employed in the fishing rod of FIG. 1.

Referring now to FIG. 3 in greater detail, blank 13 is illustrated and includes seven (7) successive longitudinal sections demarked by arrows B-B, C-C, D-D, E-E, F-F, and G-G. Each of the sections has a different taper rate which, for the inner diameter dimension is the most critical portion of the rod. These inner diameter taper rates, given in inches of diameter per inch of blank length, are as follows: 0.011, from larger diameter end 19 to transition B-B; 0.0089, between transitions B-B and C-C; 0.0087, between transitions C-C and D-D; 0.112, between transitions D-D and E-E; 0.0164, between transitions E-E and F-F; 0.010, between transitions F-F and G-G; and 0.0051, between transitions G-G and the smaller diameter end 21. The mid-zone of the rod, which began in the second or fast-tapered section of blank 11, continues along blank 13 into the section defined between transitions E-E and F-F. The tip zone of the rod extends from the end of the mid-zone to the small diameter end 21.

In a first embodiment of the rod, corresponding to the first embodiment dimensions set forth above for blank 11, the outer diameter of blank 13 has the following dimensions: 1.075 inches at large diameter end 19; 1.001 inches at transition B-B; 0.760 inches at transition C-C; 0.600 inches at transition D-D; 0.508 inches at transition E-E; 0.222 inches at transition F-F; 0.196 inches at transition G-G; and 0.114 inches at smaller diameter end 21. For this embodiment, wall thickness of blank 13 has the following dimensions: 0.045 inches at larger diameter end 19; 0.045 at transition B-B; 0.031 inches at transition C-C; 0.028 inches at transition D-D; 0.025 inches at transition E-E; 0.025 inches at transition F-F; 0.025 inches at transition G-G; and 0.023 inches at the smaller diameter end 21. Also for this embodiment, the lengths of the various sections are as follows: 7 inches from larger diameter end 19 to transition B-B; 24 inches between transition B-B and C-C; 18 inches between transition C-C and D-D; 8 inches between transition D-D and E-E; 17 inches between transition E-E and F-F; 3 inches between transition F-F and G-G; and 14½ inches between transition G-G and smaller diameter end 21. In this embodiment, the tip zone may be looked upon as extending approximately two (2) feet from larger diameter end 21 and into the section between transitions E-E and F-F. The butt zone may be looked upon as extending four (4) feet from the larger diameter end 15 of blank 11. Approximately six (6) inches of the section between transition A-A and smaller diameter end 17 of blank 11 are inserted into the larger diameter end 19 of blank 13.

In the second embodiment of the rod, for which dimensions are given above for blank 11, the outer diameter dimensions for blank 13 are as follows: 1.126 inches at larger diameter end 19; 1.03 inches at transition B-B; 0.790 inches at transition C-C; 0.618 at transition D-D; 0.530 inches at transition E-E; 0.245 inches at transition F-F; 0.219 inches at transition G-G; and 0.125 inches at smaller diameter end 21. The wall thickness dimensions for this second embodiment are as follows: 0.065 at larger diameter end 19; 0.060 at transition B-B; 0.046 at transition C-C; 0.037 at transition D-D; 0.037 at transition E-E; 0.037 at transition F-F; 0.037 at transition G-G; and 0.235 at the smaller diameter end 21. The lengths of the various sections for this embodiment are as follows: 9 inches between larger diameter end 19 and transition B-B; 24 inches between transition B-B and C-C; 18 inches between transition C-C and D-D; 8 inches between transition D-D and E-E; 17 inches between transition E-E and F-F; 3 inches between transition F-F and G-G; and 12½ inches between transition G-G and the smaller diameter end 21. In this embodiment, also the tip zone extends approximately two (2) feet from the small diameter end 21 of blank 13 into the section defined by transitions E-E and F-F. The butt zone also includes approximately four (4) feet of the blank 11 from the larger diameter end 15. Approximately eight (8) inches of blank 11, at its smaller diameter end 17, is inserted into the larger diameter end 19 of blank 13 in this embodiment.

Figure 4:
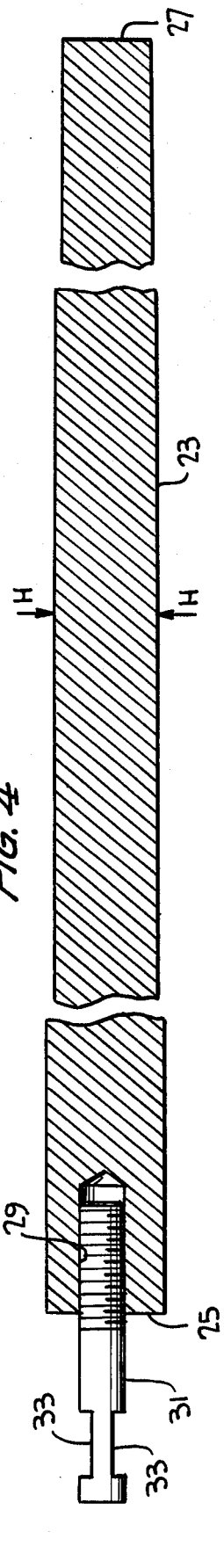
FIG. 4 is a broken view in section showing the mandrel employed to fabricate the blank of FIG. 2.

Reference is now made to FIG. 4 wherein a mandrel 23 is illustrated. Mandrel 23 is employed to fabricate the blank 11 of FIG. 2 by appropriately wrapping sheets of material about the mandrel. The wrapping method and technique are conventional; the specific sheet configurations and compositions are described below with references to FIGS. 6-10. Mandrel 23 is an elongated member which tapers from its large diameter end 25 to its small diameter end 27. In order to appropriately configure the inner diameter of blank 11 in two (2) sections of different rate of taper, mandrel 23 is divided by transition H-H into two (2) sections in which the diameter of its circular cross-section tapers at a different rate. Specifically, in the larger diameter section to the left of transition H-H, the taper rate of mandrel 23 is approximately 0.0009 inches of diameter per inch of length. To the right of transition H-H, the outer diameter taper of mandrel 23 is approximately 0.011 inches of diameter per inch of length. The mandrel length between large diameter end 25 and small diameter end 27 is, in the preferred embodiment, 68 inches. This length is sufficient to permit use of mandrel 23 for both of the embodiments of blank 11 described above. The length between small diameter end 27 and transition H-H is, in this preferred embodiment, 19 inches; the length of the slower tapered section, to the left of transition H-H in FIG. 4, is 45 inches. The remaining length of mandrel 23 may have a constant or un-tapered cross section since this portion of the mandrel is not utilized during the fabrication of blank 11 for either embodiment. The mandrel, in the embodiment described, has an outer diameter at smaller diameter end 27, of 0.745 inches. The outer diameter at transition H-H is 0.945 inches. The outer diameter at the start of the slow tapered portion is 0.996 inches.

A generally cylindrical bore 29 is provided concentrically through the larger diameter end 25 of mandrel 23 and is threaded to engage a similarly externally threaded stud 31. The bore 29 is approximately three (3) inches in length and the stud 31 is approximately two and three quarters (2¾) inches long. The exposed portion of the stud includes a pair of recesses 33 which facilitates gripping of the stud during withdrawal of mandrel 23 from the cured blank 11 during fabrication of the blank. Typically, recesses 33 are approximately 7/16 inches long and extend from a location approximately 5/16 inches from the distal end of stud 31.

Referring now to FIG. 5, a mandrel 35 is illustrated and is employed for fabricating the blank 13 of FIG. 3. Mandrel 35 is an elongated member having a circular cross-section which tapers from its larger diameter end 37 to its smaller diameter end 39. The outer diameter taper in mandrel 35 is achieved in seven (7) sections, similar to the seven (7) sections of different inner diameter taper rate described above with respect to blank 13. Specifically, the outer diameter taper rates in inches of diameter per inch of length, for mandrel 35 are as follows: 0.011 from larger diameter end 37 to transition J-J; 0.0089 between transitions J-J and K-K; 0.0087 between transitions K-K and L-L; 0.0112 between transitions L-L and M-M; 0.0164 between transitions M-M and N-N; 0.010 between transitions N-N and P-P; and 0.0051 between transitions P-P and smaller diameter end 39. The outer diameter of mandrel 35 has the following dimensions: 1.114 inches at larger diameter end 37; 0.911 inches at transition J-J; 0.698 inches at transition K-K; 0.544 inches at transition L-L; 0.457 inches at transition M-M; 0.171 inches at transition N-N; 0.145 inches at transition P-P; and 0.068 inches at the smaller diameter end 39. The overall length of the elongated member comprising mandrel 35 is 103 inches. The mandrel member has a concentric threaded bore 41 defined in its larger diameter end, which bore is arranged to threadedly engage a stud 43. Stud 43 has recesses 45 to facilitate gripping of the mandrel during withdrawal from the cured blank 13. The dimensions of stud 43 are similar to those described above for stud 31.

In the fabrication of blank 11, a rectangular sheet 51, as illustrated in FIG. 6, is first wrapped about mandrel 23. Sheet 51 is generally rectangular and has a length of 12 inches along its short side and 59 inches on its long side. The sheet is made of graphite fibers embedded in resin with the fibers extending along the long dimension. All of the sheets employed in forming blank 11 are wrapped about the mandrel 23 by tacking one of their long sides to the mandrel beginning at a location 4½ inches from the small diameter end 27 of the mandrel. Sheet 51, in its partially cured state, is then wrapped about mandrel 23. The second wrap about mandrel 23 employs sheet 52 of FIG. 8 and sheet 53 of FIG. 9. These sheets are cut to form using a pattern configured to the shape of metal pattern form 54 of FIG. 7. Specifically, sheet 52 of FIG. 8 is a generally rectangular sheet of Type 108 Scrim only having its fibers extending lengthwise or in its long dimension. Typically, sheet 52 is 59 inches long and 12 inches wide and is of rectangular shape. Sheet 53 of FIG. 9 is a 12 inch square of only graphite fibers which extend transversely to the fibers of sheet 52. Sheet 52 is cut by placing it on form 54. Form 54, as viewed in FIG. 7, has a base dimension of 59 inches, a height along the left side of 4¾ inches, a height along the right side of 3¾ inches and a height a transition Q-Q of 4 9/16 inches. The transition Q-Q is displaced 43½ inches to the right of the left edge of the form. Sheet 52 is cut to the form and tacked accordingly to mandrel 23 and wrapped.

Sheet 53 is a 12 inch square, 5 of which are employed edge-to-edge to form a 12 by 60 rectangle. These graphite sheets are then cut to form 54 and then wrapped about mandrel 53 in a similar manner.

The final wrap for mandrel 23 to form blank 11 is sheet 55 of FIG. 10. Sheet 55 is a sheet of graphite and 108 Scrim having its fibers extending longitudinally. In this regard, it should be noted that only the sheets 53 of FIG. 9 are wrapped with the threads extending transversely to the length of mandrel 23. As viewed in FIG. 10, the dimensions of sheet 55 are as follows: the base dimension is 59 inches; the height along the left edge is 7⅞ inches; the height along the right edge is 3 13/16 inches; and the height at transition R-R is 7 inches. Transition R-R is displaced 15½ inches from the right edge of sheet 55.

After all of the sheets are wrapped about mandrel 23, a cellophane outer wrap, or the like, is applied to effect uniform pressure about the wrapped material against the mandrel. The mandrel and its wrapping are then cured in an oven at a temperature of approximately 250° F. for approximately one and a half hours. After curing the mandrel is removed from the blank and the cellophane is removed from the outside of the blank. The blank may be sanded, if desired, and coated and then cut to the desired size and the appropriate ferrules applied.

The dimensions listed above for the sheets of FIGS. 6, 8, 9 and 10 apply to both of the embodiments described above for the blank. The different dimensions for the two (2) embodiments of blank 11 are achieved by merely cutting the desired amount of length from either end of the finished blank.

The blank 13 is fabricated in conjunction with mandrel 35 by using only two (2) sheets of wrap. A first sheet 61, illustrated in FIG. 11, includes a straight edge or base 62, a straight left edge 63 oriented perpendicular to base 62, a straight right edge 64 oriented perpendicular to base 62, and a further edge 65 extending between the opposite ends of edges 63 and 64. Edge 65 has a plurality of different sections of different slope demarked with respect to dimensions along base 62 by the arrows S-S, T-T, U-U, V-V, W-W and X-X. Sheet 61 is made from fiberglass with its fibers extending longitudinally along the base dimension. In wrapping it about mandrel 35, base 62 is tacked to the mandrel with edge 64 disposed exactly at the smaller diameter end 39 of the mandrel.

In the first dimensional embodiment described above for blank 13, the length dimensions of sheet 61 are as follows: base 62 is 95 inches; left edge 63 is 15 3/16 inches; right edge 64 is 1 inch; the height of the sheet at transition S-S is 12¾ inches and is located 10½ inches from left edge 63; the height at transition T-T is 8 11/16 inches and is located 24 inches from transition S-S; the height at transition U-U is 5⅞ inches and is located 18 inches from transition T-T; the height at transition V-V is 4 19/32 inches and is located 8 inches from transition U-U; the height at transition W-W is 1 15/16 inches and is located 17 inches from transition V-V; and the height at transition X-X is 1⅝ inches and is located 3 inches from transition W-W and 14½ inches from the right edge 64.

The dimensions for sheet 61 as employed in the second dimensional embodiment described above for blank 13 are as follows: base 62 is 94 inches; left edge 63 is 20 11/16 inches; right edge 64 is 1 1/16 inches; the height at transition S-S is 18 15/16 inches and is located 11½ inches from left edge 63; the height at transition T-T is 12⅞ inches and is located 24 inches from transition S-S; the height at transition U-U is 7 15/16 inches and is located 18 inches from transition T-T; the height at transition V-V is 6¼ inches and is located 8 inches from transition U-U; the height at transition W-W is 2 11/16 inches and is located 17 inches from transition V-V, and 15½ inches from right edge 64. Transition X-X does not exist for this embodiment. In this embodiment, the tack point to mandrel 35 begins 2 inches from the smaller diameter end 21 of the mandrel.

Referring to FIG. 12, a second wrap sheet 70 for blank 13 is illustrated. Sheet 70 includes a straight base 71, a left edge 72, which is also straight and perpendicular to base 71, a straight right edge 73 which forms an acute angle with base 71, and a top side 74 which joins the upper ends of edges 72 and 73. Sheet 70 is also made of fiberglass and has its fibers running lengthwise along base 71. For the first-described dimensional embodiment of blank 13, the following dimensions of sheet 70 apply: base 71 is 14 inches long; left edge 72 is 4 15/16 inches; and transition Y-Y is 4 7/16 inches and located 10 inches from left edge 72.

In the second described embodiment for blank 13, the dimensions of sheet 70 are as follows: base 71 is 15 inches; left edge 72 is 5 inches; and the height at transition Y-Y is 4½ inches and disposed 11 inches from left edge 72.

The mandrels 23 and 35 are described above, and the blanks 11 and 13 fabricated therefrom, are important elements of an improved fishing rod having a stiff butt, a fast tapered mid-zone, and a flexible tip. The increase in the order of magnitude of the taper rate between the butt zone and the mid-zone for the inner diameter of the rod is extremely important and permits the rod to have the desired long-distance casting characteristic while providing desirable fishing characteristics for all anglers. As noted, the butt section is stiff but not rigid. It provides the leverage necessary for long range fishing while retaining the "feel" for proper handling and easy casting. The use of graphite in the butt zone contributes to the long-distance casting characteristics.

The tip zone is light and flexible and has the various advantages enumerated in the Summary Of The Invention section hereinabove.

The mid-zone, encompassing a length beyond approximately four (4) feet from the large diameter end of blank 11 and approximately two (2) feet from the small diameter end of blank 13, is of crucial importance in a surf casting rod. In many respects, it is more critical than either the tip zone or the butt zone. It blends the tip flexibility to the stiffness of the butt, so that casting power and recovery action are efficient and controlled.

It also absorbs most of the shock in fighting a heavy fish.

Tests have shown that fishing rods made from blanks of the type described herein and utilizing the mandrels described herein are capable of casting up to 225 yards.

While we have described and illustrated specific embodiments of our invention, it will be clear that variations in the details of construction which are specifically illustrated and described, may be resorted to without departing from the true spirit and scope of the invention as defined in the appended claims.

We claim:

1. A fishing rod comprising:
   first and second elongated hollow tapered tubular blanks having first ends with relatively large inner and outer diameters and second ends with relatively small inner and outer diameters, said blanks being disposed coaxially with the second end of the first blank frictionally engaged within the first end of the second blank;
   wherein the inner and outer diameters of the first end of the first blank are larger than the inner and outer diameters, respectively, of the second end of the second blank;
   wherein said fishing rod includes a butt zone extending longitudinally from the first end of said first blank to include at least 70–80% of the first blank length, said butt zone having an inner diameter which tapers toward the second end of said first blank at a first relatively small average taper rate with respect to the first end of the first blank;
   wherein said fishing rod includes a tip zone extending longitudinally from said second end of said second blank to include between 20–30% of the second blank length; and
   wherein said fishing rod includes a mid-zone extending longitudinally between said butt and tip zones and overlapping said first and second blanks, said mid-zone including:
   a first longitudinally-extending section including the second end of said first blank, said first section having an inner diameter which tapers toward the second end of said first blank at a rate which is an order of magnitude greater than said first average taper rate; and
   a plurality of successive longitudinal sections, followed by successive sections of said tip zone, extending from the first end of said second blank, each successive section having an inner diameter which tapers at a rate which is different from the taper rate of the preceding section and is at least approximately one order of magnitude greater than said first average taper rate.

2. The fishing rod according to claim 1, wherein said first average taper rate is approximately 0.0009 inches of inner diameter per inch of blank length, and wherein the highest taper rate in said plurality of successive sections is approximately 0.016 inches of inner diameter per inch of blank length.

3. The fishing rod according to claim 1, wherein the inner diameter of said first blank tapers from said first end at a rate of approximately 0.0009 inches of diameter per inch of blank length throughout the major part of its length and then tapers at a rate of approximately 0.011 inches of diameter per inch of blank length to the second end of the first blank.

4. The fishing rod according to claim 3, wherein said plurality of successive sections, proceeding from the first of said second blank, have inner diameter taper rates approximately equal to 0.011, 0.0089, 0.0087, 0.0112, 0.0164, 0.010, and 0.0051 inches of diameter per inch of blank length.

5. The fishing rod according to claims 1 or 4, wherein said first blank has an outer diameter of approximately 1.1 inches and an inner diameter of approximately 0.99 inches at its first end, and an outer diameter of approximately 0.91 inches and an inner diameter of approximately 0.81 inches at its second end.

6. The fishing rod according to claim 5, wherein said second blank has an outer diameter of approximately 1.075 inches and an inner diameter of approximately 0.985 inches at its first end, and an outer diameter of approximately 0.114 inches and an inner diameter of approximately 0.068 inches at its second end.

7. The fishing rod according to claim 6, wherein said second blank has a length of approximately 91.5 inches and wherein said successive sections, proceding from the first end to the second end of said second blank, have lengths approximately equal to 7, 24, 18, 8, 17, 3, and 14.5 inches.

8. The fishing rod according to claim 7, wherein the thickness of the wall of the second blank is approximately 0.045 inches at its first end and 0.023 inches at its second end.

9. The fishing rod according to claim 7, wherein the thickness of the wall of the second blank is approximately 0.045 inches at its first end, and at the ends of each of said successive sections, proceeding from the first to the second end of the second blank, has respective thicknesses of approximately 0.045, 0.031, 0.028, 0.025, 0.25, 0.025, and 0.023 inches.

10. The fishing rod according to claim 9, wherein said first blank has a length of approximately 52⅜ inches and has a change of taper rate approximately 38⅞ inches from the first end of the first blank.

11. The fishing rod according to claim 10, wherein approximately 6 inches of the second end of the first blank is inserted into the first end of said second blank when the blanks are frictionally engaged.

12. The fishing rod according to claim 5, wherein said second blank has an outer diameter of approximately 1.126 inches and an inner diameter of approximately 0.996 inches at its first end, and an outer diameter of approximately 0.125 inches and an inner diameter of approximately 0.078 inches at its second end.

13. The fishing rod according to claim 6, wherein said second blank has a length of approximately 91.5 inches and wherein said successive sections, proceeding from the first to the second end of said second blank, have lengths approximately equal to 9, 24, 18, 8, 17, 3, and 12.5 inches.

14. The fishing rod according to claim 13, wherein the thickness of the wall of the second blank is approximately 0.065 inches at its first end and 0.0235 inches at its second end.

15. The fishing rod according to claim 13, wherein the thickness of the wall of the second blank is approximately 0.065 inches at its first end and, at the ends of each of said successive sections, proceeding from the first to the second end of said second blank, has respective thicknesses of approximately 0.060, 0.046, 0.037, 0.037, 0.037, and 0.0235 inches.

16. The fishing rod according to claim 15, wherein said first blank has a length of approximately 54⅛ inches and has a change of taper rate located approximately 40¼ inches from the first end of the first blank.

17. The fishing rod according to claim 16, wherein approximately 8 inches of the second end of the first blank is inserted into the first end of the second blank when the blanks are frictionally engaged.

* * * * *